US009973305B2

(12) United States Patent
Hwang et al.

(10) Patent No.: US 9,973,305 B2
(45) Date of Patent: *May 15, 2018

(54) SOFT BUFFER PARTITION FOR SUPERPOSITION CODING

(71) Applicant: MEDIATEK INC., Hsinchu (TW)

(72) Inventors: Chien-Hwa Hwang, Hsinchu County (TW); Yi-Ju Liao, Hsinchu (TW); Tze-Ping Low, Lexington, MA (US); Lung-Sheng Tsai, Tainan (TW)

(73) Assignee: MEDIATEK INC., HsinChu (TW)

( * ) Notice: Subject to any disclaimer, the term of this patent is extended or adjusted under 35 U.S.C. 154(b) by 166 days.

This patent is subject to a terminal disclaimer.

(21) Appl. No.: 14/980,867

(22) Filed: Dec. 28, 2015

(65) Prior Publication Data

US 2016/0192383 A1 Jun. 30, 2016

Related U.S. Application Data

(60) Provisional application No. 62/097,813, filed on Dec. 30, 2014, provisional application No. 62/097,809, filed on Dec. 30, 2014.

(51) Int. Cl.
*H04W 72/12* (2009.01)
*H04L 1/18* (2006.01)
(Continued)

(52) U.S. Cl.
CPC .......... *H04L 1/1812* (2013.01); *H04L 1/0067* (2013.01); *H04L 1/1822* (2013.01);
(Continued)

(58) Field of Classification Search
None
See application file for complete search history.

(56) References Cited

U.S. PATENT DOCUMENTS 7,529,227 B2   5/2009   Seguin et al. ............... 370/352
8,286,047 B2   10/2012  Che et al. ..................... 714/751
(Continued)

FOREIGN PATENT DOCUMENTS

CN   101094048 A   12/2007
CN   101965707 A   2/2011
(Continued)

OTHER PUBLICATIONS

USPTO, Office Action for related U.S. Appl. No. 14/980,750 dated Jun. 13, 2017 (9 pages).
(Continued)

*Primary Examiner* — Chi H Pham
*Assistant Examiner* — Shick Hom
(74) *Attorney, Agent, or Firm* — Imperium Patent Works; Zheng Jin (57) ABSTRACT

When the codeword level interference cancellation (CW-IC) is used at the receiver in conjunction with the superposition coding scheme at the transmitter, it is helpful if the soft buffer at the receiver is reserved not only for the desired transport blocks (TBs) but also for the interfering TBs handled by the CW-IC. In so doing, the soft channel bits of interfering TBs at multiple (re)transmissions can be combined to enhance the success rate of data decoding. A soft buffer partition method for the soft channel bits of the desired and interfering TBs in the superposition coding scheme is proposed. The proposed method has a full flexibility in adjusting the soft buffer sizes for the desired and interfering TBs.

22 Claims, 9 Drawing Sheets (51) Int. Cl.
*H04W 52/26* (2009.01)
*H04W 52/24* (2009.01)
*H04L 1/00* (2006.01)
H04W 28/06 (2009.01)
H04W 28/22 (2009.01)
H04L 5/00 (2006.01)
H04L 5/14 (2006.01)

(52) U.S. Cl.
CPC .......... *H04L 1/1845* (2013.01); *H04L 1/1896* (2013.01); *H04L 5/0053* (2013.01); *H04L 5/0069* (2013.01); *H04W 52/243* (2013.01); *H04W 52/267* (2013.01); *H04W 72/1252* (2013.01); *H04L 5/001* (2013.01); *H04L 5/0023* (2013.01); *H04L 5/14* (2013.01); *H04W 28/065* (2013.01); *H04W 28/22* (2013.01); *H04W 52/262* (2013.01); *H04W 72/12* (2013.01)

(56) References Cited

U.S. PATENT DOCUMENTS

| | | | | |
|---|---|---|---|---|
| 8,665,720 | B2 | 3/2014 | Shen et al. | 370/235 |
| 8,724,742 | B2 | 5/2014 | Nimbalker et al. | 375/316 |
| 8,908,632 | B2 | 12/2014 | Pi et al. | 370/330 |
| 9,444,591 | B2 | 9/2016 | Pi et al. | |
| 9,680,578 | B2* | 6/2017 | Hwang | H04B 15/00 |
| 2005/0233754 | A1* | 10/2005 | Beale | H04W 24/06 |
| | | | | 455/452.2 |
| 2008/0005638 | A1 | 1/2008 | Kuo et al. | 714/748 |
| 2009/0318183 | A1 | 12/2009 | Hugl et al. | 455/522 |
| 2010/0050034 | A1 | 2/2010 | Che et al. | 714/748 |
| 2011/0231562 | A1 | 9/2011 | Karlsen et al. | 709/228 |
| 2012/0057529 | A1 | 3/2012 | Seo et al. | 370/328 |
| 2012/0087396 | A1 | 4/2012 | Nimbalker et al. | 375/219 |
| 2012/0269137 | A1 | 10/2012 | Kang et al. | 370/329 |
| 2012/0275397 | A1 | 11/2012 | Hsieh et al. | 370/329 |
| 2013/0044697 | A1 | 2/2013 | Yoo et al. | 370/329 |
| 2013/0051289 | A1 | 2/2013 | Hsieh et al. | 370/280 |
| 2013/0121216 | A1 | 5/2013 | Chen et al. | 370/280 |
| 2013/0165183 | A1 | 6/2013 | Gerstenberger et al. | 455/561 |
| 2013/0252624 | A1 | 9/2013 | Pajukoski et al. | 455/452.1 |
| 2014/0044091 | A1 | 2/2014 | Kishiyama | 370/330 |
| 2014/0044206 | A1 | 2/2014 | Nammi et al. | 375/267 |
| 2014/0050279 | A1 | 2/2014 | Kishiyama | 375/259 |
| 2014/0071894 | A1* | 3/2014 | Kairouz | H04W 88/06 |
| | | | | 370/328 |
| 2014/0086372 | A1 | 3/2014 | Kishiyama et al. | 375/346 |
| 2014/0245095 | A1 | 8/2014 | Nammi et al. | 714/749 |
| 2014/0307569 | A1 | 10/2014 | Barbieri et al. | 370/329 |
| 2014/0321418 | A1 | 10/2014 | Rinne et al. | 370/329 |
| 2014/0370842 | A1 | 12/2014 | Abtin et al. | 455/404.2 |
| 2015/0029926 | A1* | 1/2015 | Ryu | H04L 1/1861 |
| | | | | 370/312 |
| 2015/0171983 | A1 | 6/2015 | Kusashima | 370/329 |
| 2015/0312074 | A1 | 10/2015 | Zhu et al. | 370/329 |
| 2016/0050049 | A1 | 2/2016 | Yang et al. | 370/329 |
| 2016/0080133 | A1 | 3/2016 | Golitschek Edler von Elbwart et al. | |
| 2016/0112995 | A1 | 4/2016 | Chen | 370/329 |
| 2016/0173262 | A1* | 6/2016 | Davydov | H04W 64/006 |
| | | | | 370/329 |
| 2016/0174230 | A1 | 6/2016 | Benjebbour et al. | 370/329 |
| 2016/0191174 | A1 | 6/2016 | Hwang et al. | 375/348 |
| 2016/0192383 | A1 | 6/2016 | Hwang et al. | 370/330 |
| 2016/0337018 | A1 | 11/2016 | Hwang et al. | 370/330 |
| 2016/0337879 | A1 | 11/2016 | Hwang et al. | 370/329 |
| 2017/0041906 | A1 | 2/2017 | Tsai et al. | 370/329 |
| 2017/0118665 | A1 | 4/2017 | Park et al. | 370/329 |
| 2017/0134109 | A1 | 5/2017 | Hwang et al. | 370/201 |
| 2017/0134150 | A1 | 5/2017 | Hwang et al. | 370/280 |
| 2017/0135114 | A1 | 5/2017 | Hwang et al. | 370/329 |

FOREIGN PATENT DOCUMENTS

| | | |
|---|---|---|
| CN | 102761510 A | 10/2012 |
| CN | 103051435 A | 4/2013 |
| CN | 103155470 A | 6/2013 |
| CN | 103493380 A | 1/2014 |
| CN | 103609052 A | 2/2014 |
| CN | 104040930 A | 9/2014 |
| JP | 2015012458 A | 1/2015 |
| WO | WO2012161081 A1 | 11/2012 |
| WO | WO2013070837 A1 | 5/2013 |
| WO | WO2013176042 A1 | 11/2013 |
| WO | WO2014208140 A1 | 12/2014 |

OTHER PUBLICATIONS

USPTO, Notice of Allowance for related U.S. Appl. No. 14/981,154 dated Jul. 13, 2017 (9 pages).
USPTO, Office Action for related U.S. Appl. No. 14/980,991 dated Aug. 19, 2016 (15 pages).
EPO, Search Report for the EP patent application 15875245.1 dated Aug. 29, 2017 (10 pages).
3GPP TSG RAN Meeting #66 RP-141895, MediaTek Inc., Motivation for Enhanced Multiuser Transmissions and Network Assisted Interference Cancellation for LTE, Maui, USA dated Dec. 8-11, 2014, p. 3-p. 4.
EPO, Search Report for the EP patent application 15875246.9 dated Aug. 29, 2017 (10 pages).
3GPP TSG-RAN WG1 Meeting #76 R1-140402, ITRI, Maximum Number of DL HARQ processes for TDD eIMTA, Prague, Czech Republic dated Feb. 10-14, 2014 (4 pages).
EPO, Search Report for the EP patent application 15875248.5 dated Aug. 31, 2017 (9 pages).
USPTO, the Notice of Allowance for related U.S. Appl. No. 14/980,750 dated Oct. 4, 2017 (8 pages).
International Search Report and Written Opinion of International Search Authority for PCT/CN2015/099663 dated Mar. 23, 2016 (11 pages).
International Search Report and Written Opinion of International Search Authority for PCT/CN2015/099664 dated Mar. 24, 2016 (12 pages).
International Search Report and Written Opinion of International Search Authority for PCT/CN2015/099665 dated Mar. 24, 2016 (11 pages).
International Search Report and Written Opinion of International Search Authority for PCT/CN2015/099666 dated Mar. 22, 2016 (11 pages).
Metis, Deliverable D2.3, Components of a new air interface-building blocks and performance, Apr. 2014. Section 2.11.1.
3GPP TS 36.212 V13.1.0 (Mar. 2016), 3rd Generation Partnership Project; Technical specification Group Radio access Network; Evolved Universal Terrestrial Radio Access (E-UTRA); Multiplexing and channel coding (Release 13) Section 5.1.4.1.2.
EPO, Search Report for the EP patent application 15875247.7 dated Nov. 23, 2017 (8 pages).
Choi "H-ARQ based on Non-Orthogonal Multiple Access with Successive Interference cancellation", 2008, IEEE, pp. 1-5.

* cited by examiner

SOFT BUFFER PARTITION FOR SUPERPOSITION CODING

CROSS REFERENCE TO RELATED APPLICATIONS

This application claims priority under 35 U.S.C. § 119 from U.S. Provisional Application No. 62/097,809, entitled "Rate Matching and Soft Channel Bits Storage for Superposition Coding," filed on Dec. 30, 2014; U.S. Provisional Application No. 62/097,813, entitled "Soft Buffer Partition for Superposition Coding," filed on Dec. 30, 2014, the subject matter of which is incorporated herein by reference.

TECHNICAL FIELD

The disclosed embodiments relate generally to mobile communication networks, and, more particularly, to rate matching, soft channel bits storage, and soft buffer partition for superposition coding.

BACKGROUND

In a wireless cellular communications system, multiuser multiple-input multiple-output (MU-MIMO) is a promising technique to significantly increase the cell capacity. In MU-MIMO, the signals intended to different users are simultaneously transmitted with orthogonal (or quasi-orthogonal) precoders. On top of that, the concept of a joint optimization of multiuser operation from both transmitter and receiver's perspective has the potential to further improve multiuser system capacity even if the transmission/precoding is non-orthogonal which could come from, for example but not limited to, the simultaneous transmission of a large number of non-orthogonal beams/layers with the possibility of more than one layer of data transmission in a beam. Such non-orthogonal transmission could allow multiple users to share the same resource elements without spatial separation, and allow improving the multiuser system capacity for networks with a small number of transmit antennas (i.e. 2 or 4, or even 1), where MU-MIMO based on spatial multiplexing is typically limited by wide beamwidth. An example of such joint Tx/Rx optimization associated with adaptive Tx power allocation and codeword level interference cancellation (CW-IC) receiver is recently a remarkable technical trend, including non-orthogonal multiple access (NOMA) and other schemes based on superposition coding.

In LTE, the rate-matching algorithm repeats or punctures the bits of a mother codeword to generate a requested number of bits according to the size of the time-frequency resource and a desired code rate that may be different from the mother code rate of the channel encoder. Besides, rate matching also needs to take into account the soft buffer size of a code block at the receiver if soft packet combining is to be used to enhance the decoding performance. When superposition coding is used, a transport block intended to one user may also need to be decoded at another user's receiver. Nevertheless, according to the specifications of LTE, the soft buffer size per code block depends on the UE category. Therefore, the soft buffer sizes of the two receivers may not be the same. To enable the superposition coding in LTE, some issues related to rate matching need to be investigated. Specifically, two issues related to the soft buffer size setting at the transmitter and soft channel bits storage at the receiver in the superposition coding are discussed and resolved.

Furthermore, the soft buffers in the receiver are reserved for the desired signal as well as the interfering signals to be handled by CW-IC. As a result, the UE and the network should have the same understanding on the partition of the soft buffer for the two types of signals. Otherwise, the soft channel bits of some transport blocks (TBs) may not be accumulated, and soft packet combining of multiple (re) transmissions does not work efficiently. Up to LTE Rel-12, the soft buffer is reserved only for desired TBs, and the partition schemes for TBs is related to the number of DL HARQ processes. Thus, a method of soft buffer partition and restricting a total number of active DL HARQ processes for both desired and interfering TBs in superposition coding is proposed.

SUMMARY

Methods for rate matching with soft buffer size setting at the transmitter and soft channel bits storage at the receiver for superposition coding are proposed. In the superposition coding scheme, a transport block intended to one UE needs to be decoded by another UE's receiver. However, the soft buffer sizes per code block of the two receivers may not be the same since the size depends on the UE category. The base station can signal the soft buffer size used at the transmitter for rate matching to the UEs for superposition decoding. A UE stores soft channel bits of encoded information bits associated with an interfering signal in its soft buffers in accordance with the soft buffer size used at the transmitter for rate matching. As a result, the UE can decode and subtract the interfering signal from the desired signal for superposition coding.

When the codeword level interference cancellation (CW-IC) is used at the receiver in conjunction with the superposition coding scheme at the transmitter, it is helpful if the soft buffer at the receiver is reserved not only for the desired transport blocks (TBs) but also for the interfering TBs handled by the CW-IC. In so doing, the soft channel bits of interfering TBs at multiple (re)transmissions can be combined to enhance the success rate of data decoding. A soft buffer partition method for the soft channel bits of the desired and interfering TBs in the superposition coding scheme is proposed. The proposed method has a full flexibility in adjusting the soft buffer sizes for the desired and interfering TBs.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
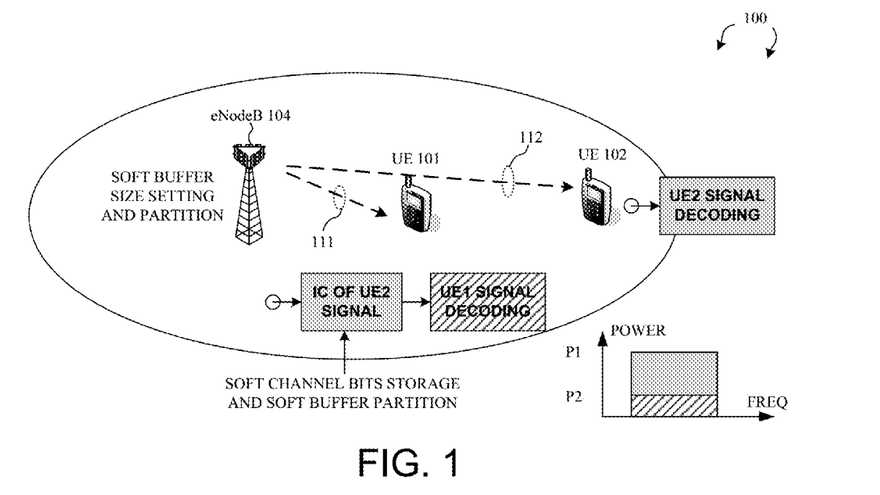
FIG. 1 illustrates a mobile communication network with rate matching and soft channel bits storage for superposition coding and interference cancellation in accordance with one novel aspect.

FIG. 1 illustrates a mobile communication network 100 with superposition coding in accordance with one novel aspect. Mobile communication network 100 is an OFDM network comprising a plurality of user equipments UE 101, UE 102, and a serving base station eNB 104. In 3GPP LTE system based on OFDMA downlink, the radio resource is partitioned into subframes in time domain, each subframe is comprised of two slots and each slot has seven OFDMA symbols in the case of normal Cyclic Prefix (CP), or six OFDMA symbols in the case of extended CP. Each OFDMA symbol further consists of a number of OFDMA subcarriers in frequency domain depending on the system bandwidth. The basic unit of the resource grid is called Resource Element (RE), which spans an OFDMA subcarrier over one OFDMA symbol. Resource elements are grouped into resource blocks, where each resource block (RB) consists of 12 consecutive subcarriers in one slot.

Several physical downlink channels and reference signals are defined to use a set of resource elements carrying information originating from higher layers. For downlink channels, the Physical Downlink Shared Channel (PDSCH) is the main data-bearing downlink channel in LTE, while the Physical Downlink Control Channel (PDCCH) is used to carry downlink control information (DCI) in LTE. The control information may include scheduling decision, information related to reference signal information, rules forming the corresponding transport block (TB) to be carried by PDSCH, and power control command. For reference signals, Cell-specific reference signals (CRS) are utilized by UEs for the demodulation of control/data channels in non-precoded or codebook-based precoded transmission modes, radio link monitoring and measurements of channel state information (CSI) feedback. UE-specific reference signals (DM-RS) are utilized by UEs for the demodulation of control/data channels in non-codebook-based precoded transmission modes.

In the example of FIG. 1, UE 101 (UE#1) is served by its serving base station eNB 104. UE#1 receives desired radio signal 111 transmitted from eNB 104. However, UE#1 also receives interfering radio signals. In one example, UE#1 receives interfering radio signal 112 transmitted from the same serving eNB 104 due to non-orthogonal multiple access (NOMA) operation intended for multiple UEs (e.g., UE 102/UE#2) in the same serving cell. UE#1 may be equipped with an interference cancellation (IC) receiver that is capable of cancelling the contribution of the interfering signals from the desired signals.

Assume superposition coding scheme is used at the transmitter for the NOMA operation. Given the scenario of NOMA where UE#1 and UE#2 are scheduled in the same time-frequency resource and the transport blocks (TBs) intended to UEs #1 and #2 are superposed and multi-casted to the two users with different transmission power levels (P1>P2). Suppose that UE#1 is closer to the base station (eNB 104) than UE#2, and the former and latter UEs are referred to as high- and low-geometry UEs, respectively. According to the rule of signal reception of NOMA, the receiver of UE#1 should perform codeword level interference cancellation (CW-IC) for the TB intended to UE#2. Specifically, UE#1 decodes the TB intended to UE#2, reconstructs the contribution of the UE#2's signal in the received signal, and then subtracts the reconstructed signal from the received signal to form a clean received signal. UE#1 can therefore decode its own signal via the clean received signal. When UE#1 has a decoding failure for UE#2's TB, it is helpful for the next decoding of the TB if UE#1 stores the soft channel bits of that TB. Therefore, when NOMA is used, it is beneficial for the high-geometry UE to be equipped with a soft buffer not only for its own signal but also for those interfering signals to be processed with the CW-IC. In so doing, multiple (re)transmissions of the interfering TB can be combined to enhance the success rate of decoding.

In LTE, the rate-matching algorithm repeats or punctures the bits of a mother codeword to generate a requested number of bits according to the size of the time-frequency resource and a desired code rate that may be different from the mother code rate of the channel encoder. Besides, rate matching also needs to take into account the soft buffer size of a code block at the receiver if soft packet combining is to be used to enhance the decoding performance. In the superposition coding scheme, the TB intended to UE#2 is to be decoded by both UE#1 and UE#2. However, the soft buffer sizes per code block of the two receivers may not be the same since the size depends on the UE category. In accordance with one novel aspect, two issues of rate matching, i.e., the soft buffer size setting at the transmitter (eNB 104) and soft channel bits storage at the receiver (UE#1), in the superposition coding are discussed and resolved.

Furthermore, the soft buffers in the receiver are reserved for the desired signal as well as the interfering signals to be handled by CW-IC. As a result, the UE and the network should have the same understanding on the partition of the soft buffer for the two types of signals. Otherwise, the soft channel bits of some TBs may not be accumulated, and soft packet combining of multiple (re)transmissions does not work efficiently. Up to LTE Rel-12, the soft buffer is reserved only for desired TBs, and the partition schemes for TBs are related to the number of DL HARQ processes. Thus, a method of soft buffer partition and restricting a total number of active DL HARQ processes for both desired and interfering TBs in superposition coding is proposed.

Figure 2:
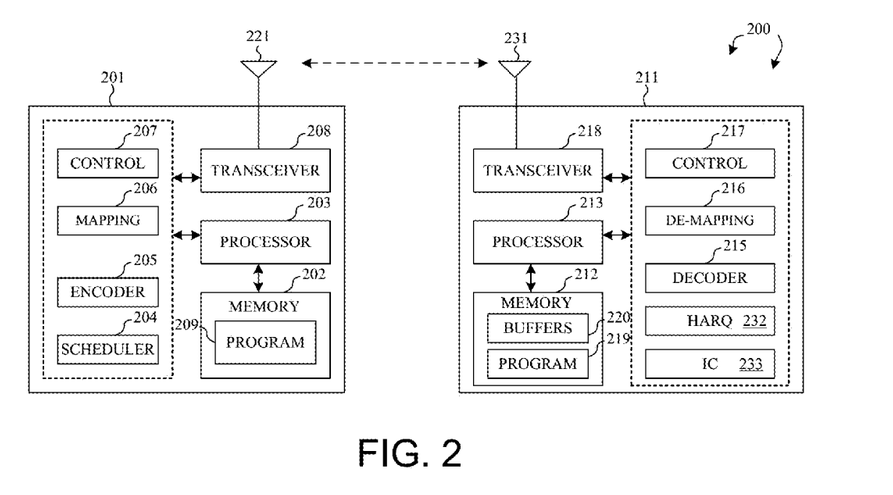
FIG. 2 is a simplified block diagram of a base station and a user equipment that carry out certain embodiments of the present invention.

FIG. 2 is a simplified block diagram of a base station 201 and a user equipment 211 that carry out certain embodiments of the present invention in a mobile communication network 200. For base station 201, antenna 221 transmits and receives radio signals. RF transceiver module 208, coupled with the antenna, receives RF signals from the antenna, converts them to baseband signals and sends them to processor 203. RF transceiver 208 also converts received baseband signals from the processor, converts them to RF signals, and sends out to antenna 221. Processor 203 processes the received baseband signals and invokes different functional modules to perform features in base station 201. Memory 202 stores program instructions and data 209 to control the operations of the base station. Similar configuration exists in UE 211 where antenna 231 transmits and receives RF signals. RF transceiver module 218, coupled with the antenna, receives RF signals from the antenna, converts them to baseband signals and sends them to processor 213. The RF transceiver 218 also converts received baseband signals from the processor, converts them to RF signals, and sends out to antenna 231. Processor 213 processes the received baseband signals and invokes different functional modules to perform features in UE 211. Memory 212 stores program instructions and data 219 to control the operations of the UE. Memory 212 also contains a plurality of soft buffers 220 for storing soft channel bits of encoded code blocks.

Base station 201 and UE 211 also include several functional modules to carry out some embodiments of the present invention. The different functional modules are circuits that can be configured and implemented by software, firmware, hardware, or any combination thereof. The function modules, when executed by the processors 203 and 213 (e.g., via executing program codes 209 and 219), for example, allow base station 201 to schedule (via scheduler 204), encode (via encoder 205), mapping (via mapping circuit 206), and transmit control information and data (via control circuit 207) to UE 211, and allow UE 211 to receive, de-mapping (via de-mapper 216), and decode (via decoder 215) the control information and data (via control circuit 217) accordingly with interference cancellation capability. In one example, base station 201 provides code block soft buffer size of other UEs to UE 211. Under NOMA operation, upon receiving superposed code blocks intended for other UEs and corresponding soft buffer size, UE 211 is then able to perform Hybrid Automatic Repeat Request (HARQ) via HARQ handler 232, store soft channel bits into partitioned soft buffers for both desired and interfering TBs, and perform codeword level interference cancellation (CW-IC) via IC circuit 233 to decode the superposed code blocks and cancel the contribution of the interfering signals accordingly.

Figure 3:
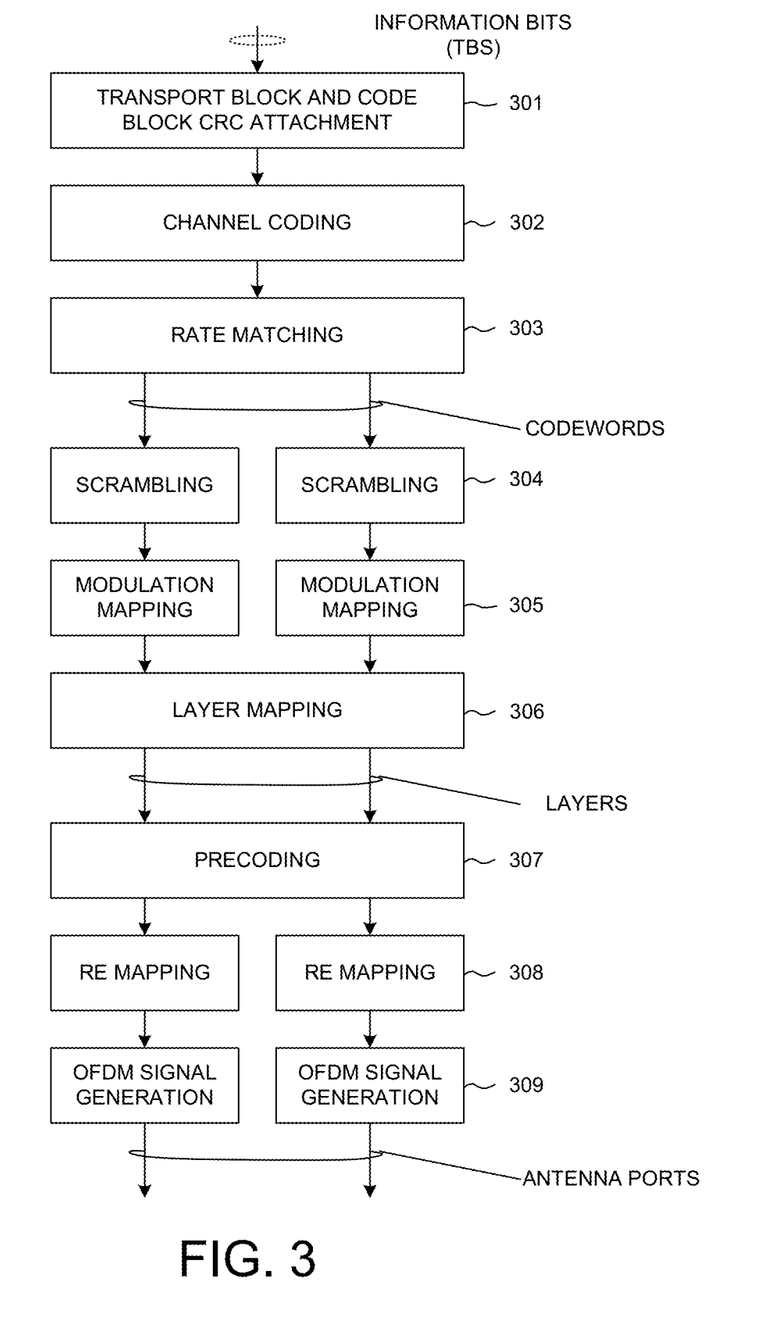
FIG. 3 illustrates functional blocks in a communication system that maps information bits of a transport block to codewords and then maps to baseband signals for transmission.

FIG. 3 illustrates functional blocks of a transmitting device in a communication system that map information bits of a transport block (TB) to codewords and then map to baseband signals for transmission. In step 301, the information bits are arranged into transport blocks (TBs) and attached with CRC. In addition, the TBs are segmented into code blocks and attached with CRC. In step 302, channel coding (forward error correction such as Turbo coding) is performed with certain code rate. In step 303, rate matching is performed, which creates an output with a desired code rate, and where the TBs are mapped into codewords. In step 304, the codewords are scrambled based on predefined scrambling rule (e.g., scramble with a corresponding Radio Network Temporary Identifier (RNTI) of the UE). In step 305, modulation mapping is performed, where the codewords are modulated based on various modulation orders (e.g., PSK, QAM) to create complex-valued modulation symbols. In step 306, layer mapping is performed, where the complex-valued symbols are mapped onto different MIMO layers depending on the number of transmit antenna used. In step 307, precoding is performed with certain precoding matrix index (PMI) for each antenna port. In step 308, the complex-valued symbols for each antenna are mapped onto corresponding resource elements (REs) of physical resource blocks (PRBs). Finally, in step 309, OFDM signals are generated for baseband signal transmission via antenna ports.

At the receiving side, a UE reserves a soft buffer to store soft channel bits for HARQ soft packet combining and decoding of the received information bits. The soft buffer size of a TB is denoted by $N_{IR}$ bits (also referred as sub-buffer size), and the soft buffer size for a code block is denoted by $N_{cb}$ bits (also referred as code block soft buffer size). According to 3GPP TS 36,212, the sizes $N_{cb}$ can be determined as follows:

$$N_{cb} = \min\left(\left\lfloor \frac{N_{IR}}{C} \right\rfloor, K_w\right) \quad (1)$$

Where
  $N_{IR}$ is the soft buffer size for a TB;
  C is the number of code blocks contained in a code word; and
  $K_w$ is the size of the output of the turbo encoder.

Rate Matching and Soft Channel Bits Storage

Figure 4:
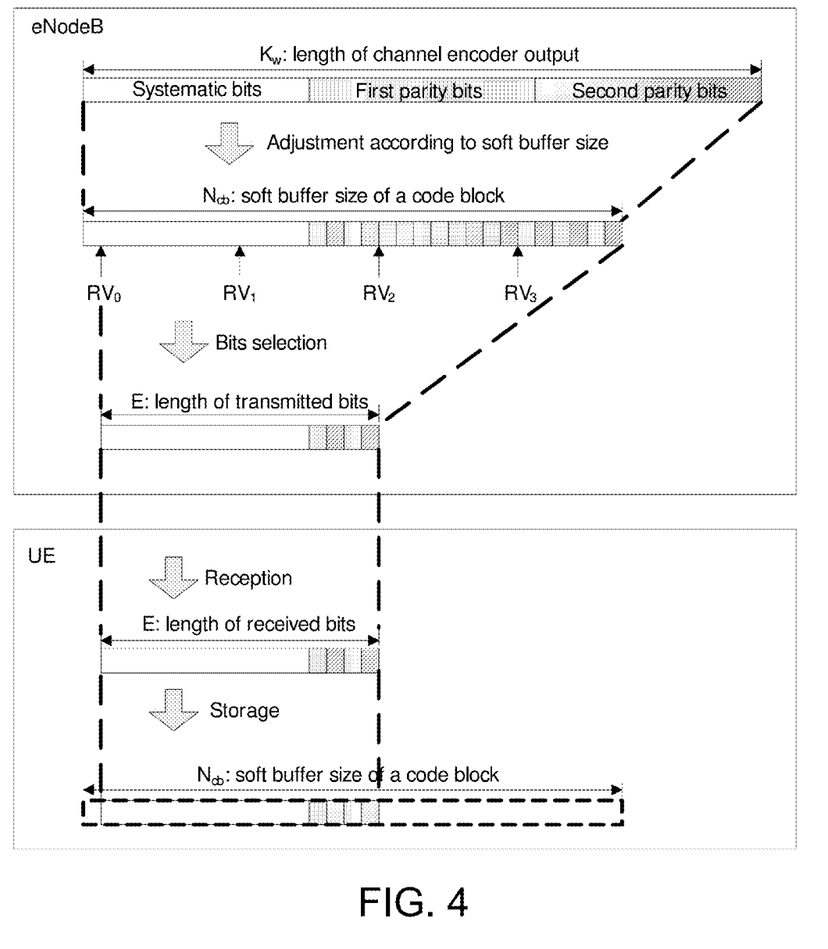
FIG. 4 illustrates an LTE rate matching procedure at the eNodeB and HARQ soft packet combining at the UE.

FIG. 4 illustrates an LTE rate matching procedure at the eNodeB and HARQ soft packet combining at the UE. At the eNodeB transmitter, the information bits are turbo encoded with the code rate of R=⅓ to generate $K_w$ coded bits. The number of transmitted coded bits is determined based on the size of the allocated time-frequency resource and the modulation coding scheme (MCS) assigned to the UE. Two-step rate matching is applied. The first step is applied only if $N_{cb} < K_w$. The purpose is to truncate the coded bits so that the truncated coded bits do not exceed the soft buffer size $N_{cb}$. In the second step, E consecutive coded bits are selected from the truncated coded bits (output of the first step), where E is the number of bits determined according to the size of allocated resource and the MCS level. The starting point of E coded bits is decided by the value of the redundancy version $RV_j$, i=0, 1, 2, 3, as shown in FIG. 4. In the event of retransmission, a different RV is used to obtain a higher coding gain for an incremental redundancy soft packet-combining scheme.

At the UE receiver, the log likelihood ratio (LLRs), {$b_j(k)$; k=0, 1, . . . , E−1}, for the j-th (re)-transmission, called soft channel bits, are computed. If the soft buffer for the code block is empty, the soft channel bits {$b_j(k)$} are stored in the $N_{cb}$-sized soft buffer; otherwise, the soft channel bits stored at the soft buffer are updated based on the newly computed {$b_j(k)$}. Finally, turbo decoding is performed to recover the information bits.

Figure 5:
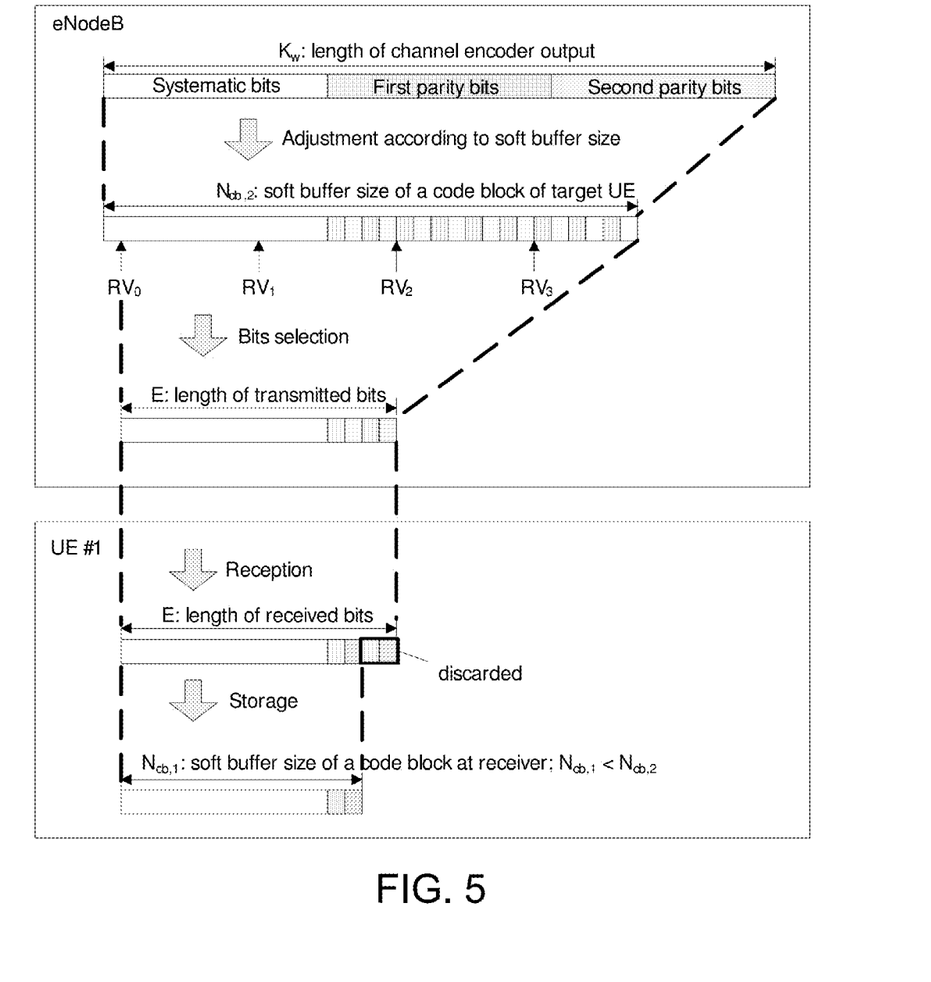
FIG. 5 illustrates a first embodiment of LTE rate matching for superposition coding, where eNodeB determines soft buffer size for rate matching based on the code block soft buffer size reserved at each UE.

FIG. 5 illustrates a first embodiment of LTE rate matching for superposition coding, where eNodeB determines soft buffer size for rate matching based on the code block soft buffer size $N_{cb}$ reserved at each UE. In the example of FIG.

5, UE#1 and UE#2 are two UEs scheduled in the same time-frequency resource, and the TBs intended to UE#1 and UE#2 are superposed. According to the rule of signal reception of NOMA, if UE#1 is the high-geometry UE, then the TB intended to UE#2 is to be decoded at both receivers of UE#1 and UE#2. Denote the soft buffer sizes per code block of UE#1 and UE#2 by $N_{cb,1}$ and $N_{cb,2}$, respectively. It is assumed that $N_{cb,1}<N_{cb,2}$. In this embodiment, the first step of rate matching is performed at the eNodeB based on the soft buffer size $N_{cb,2}$ of UE#2 (the target UE of the TB). That is, the first $N_{cb,2}$ bits are chosen from the length-$K_w$ turbo encoder output. In the second step of the rate matching, E consecutive bits are selected from the output bits sequence of the first step.

In accordance with one novel aspect, the soft buffer size $N_{cb,2}$ used at the eNodeB transmitter for rate matching should be signaled to UE#1 for the purpose of code block decoding. The redundancy version of the code block should also be signaled. As depicted by FIG. 5, at the UE#1's receiver, all the soft channel bits $\{bj(k); k=0, 1, \ldots, E-1\}$ are input into the turbo decoder. If the decoding fails and the soft channel bits are to be stored at the soft buffer, in the case of $N_{cb,1}<N_{cb,2}$, the soft buffer size reserved at UE#1's receiver is insufficient to store all $N_{cb,2}$ soft channel bits. In this case, only those soft channel bits corresponding to the first $N_{cb,1}$ bits of the length-$K_w$ turbo encoder output are stored; those corresponding to the remaining $N_{cb,2}-N_{cb,1}$ coded bits are discarded. At the UE#2's receiver, since the receiver's soft buffer size per code block $N_{cb,2}$ is the same as the soft buffer size used at the first step of rate matching, the behavior of the soft channel bits storage is the same as in the conventional LTE systems.

Figure 6:
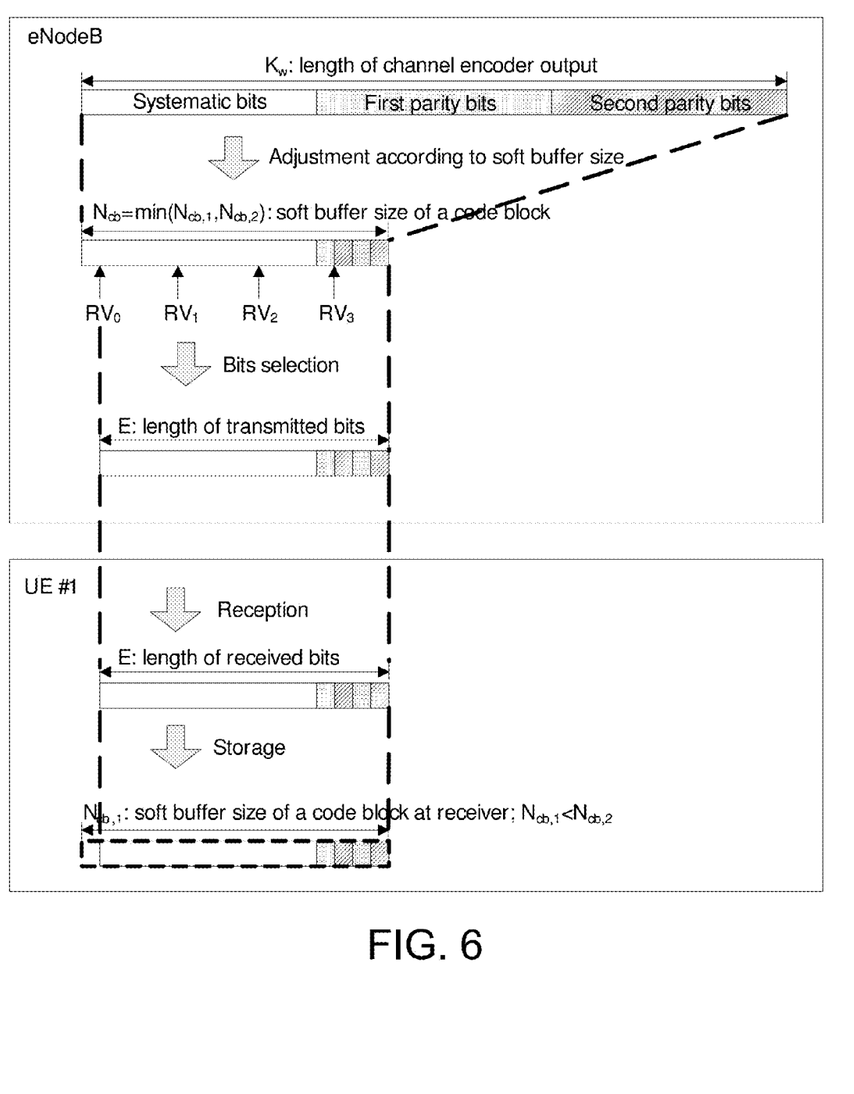
FIG. 6 illustrates a second embodiment of LTE rate matching for superposition coding, where eNodeB determines soft buffer size for rate matching based on the minimum code block soft buffer size reserved at both UEs involved in superposition coding.

FIG. 6 illustrates a second embodiment of LTE rate matching for superposition coding, where eNodeB determines soft buffer size for rate matching based on the minimum code block soft buffer size $N_{cb}$ reserved at both UEs involved in superposition coding. In the example of FIG. 6, UE#1 and UE#2 are two UEs scheduled in the same time-frequency resource, and the TBs intended to UE#1 and UE#2 are superposed. According to the rule of signal reception of NOMA, if UE#1 is the high-geometry UE, then the TB intended to UE#2 is to be decoded at both receivers of UE#1 and UE#2. Denote the soft buffer sizes per code block of UE#1 and UE#2 by $N_{cb,1}$ and $N_{cb,2}$, respectively. It is assumed that $N_{cb,1}<N_{cb,2}$. In this embodiment, the first step of the rate matching is based on the code block soft buffer size $N_{cb}=\min(N_{cb,1}, N_{cb,2})$. The soft buffer size $N_{cb}$ used at eNodeB rate matching should be signaled to UE#1 and UE#2 for code block decoding. The redundancy version of the code block should also be signaled. Since $N_{cb} \le N_{cb,1}$ and $N_{cb} \le N_{cb,2}$, the behavior of the soft channel bits storage is the same as in the conventional LTE systems.

Figure 7:
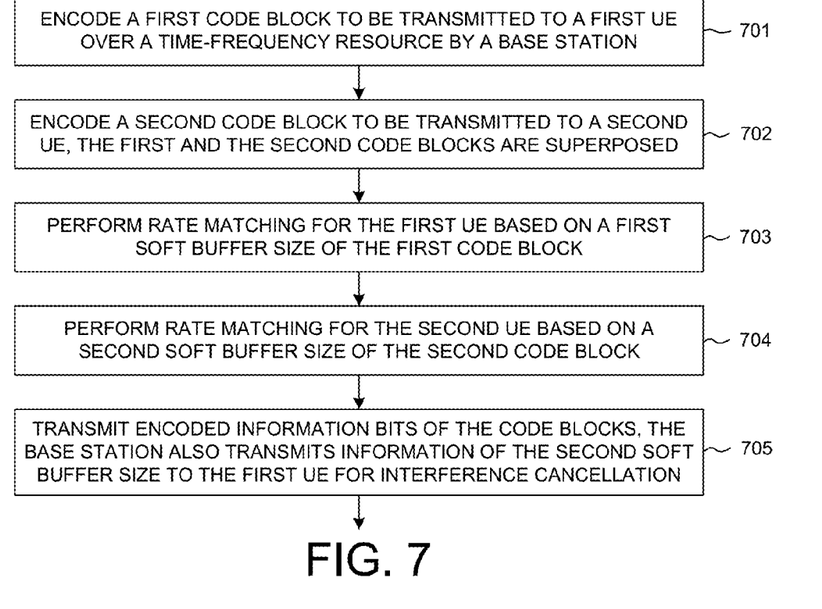
FIG. 7 is a flow chart of a method of rate matching and soft channel bits storage from eNB perspective in accordance with one novel aspect.

FIG. 7 is a flow chart of a method of rate matching and soft channel bits storage from eNB perspective in accordance with one novel aspect. In step 701, a base station encodes a first code block to be transmitted to a first UE over a time-frequency resource. In step 702, the base station encodes a second code block to be transmitted to a second UE. The first code block and the second code block are superposed. In step 703, the base station performs rate matching for the first UE based on a first soft buffer size of the first code block. In step 704, the base station performs rate matching for the second UE based on a second soft buffer size of the second code block. In step 705, the base station transmits encoded information blocks of the code blocks. The base station also transmits information of the second soft buffer size to the first UE for interference cancellation.

Figure 8:
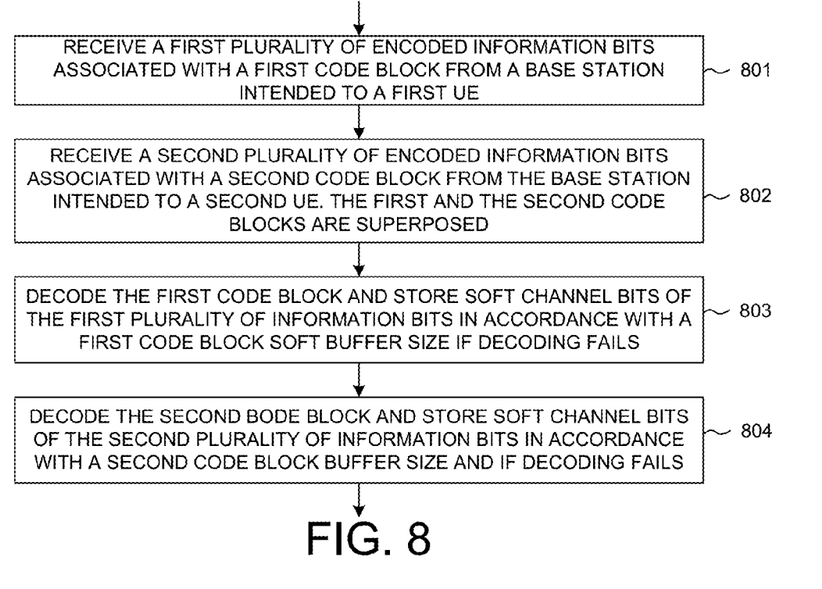
FIG. 8 is a flow chart of a method of rate matching and soft channel bits storage from UE perspective in accordance with one novel aspect.

FIG. 8 is a flow chart of a method of rate matching and soft channel bits storage from UE perspective in accordance with one novel aspect. In step 801, a first UE receives a first plurality of encoded information bits associated with a first code block from a base station intended to the first UE. In step 802, the first UE receives a second plurality of encoded information bits associated with a second code block from the base station intended to a second UE. The first code block and the second code block are superposed. In step 803, the first UE decodes the first code block and stores soft channel bits of the first plurality of information bits in accordance with a first code block soft buffer size if the decoding of the first code block fails. In step 804, the first UE decodes the second code block and stores soft channel bits of the second plurality of information bits in accordance with a second code block soft buffer size if the decoding of the second code block fails.

Soft Buffer Partition

Up to Rel-12 LTE, the soft buffer is reserved only for the desired TBs. The partition scheme for TBs carried in different component carriers, HARQ processes, and spatial layers is briefly described below. The soft buffer size for a TB is denoted by $N_{IR}$ bits (also referred as sub-buffer size). According to the latest version of 3GPP TS 36.212, the size $N_{IR}$ can be determined as:

$$N_{IR} = \left\lfloor \frac{N_{soft}}{K_C \cdot K_{MIMO} \cdot \min(M_{DL\_HARQ}, M_{limit})} \right\rfloor \quad (2)$$

Where $N_{soft}$: total number of soft channel bits;

$K_C \in \{1,2,5\}$: a number depending on $N_{soft}$ and UE capability in the number of supportable spatial layers;

$K_{MIMO}$: equal to 2 if the UE is configured to receive the physical downlink shared channel (PDSCH) transmissions based on transmission modes 3, 4, 8, 9 or 10, and is equal to 1 otherwise;

$M_{DL\_HARQ}$: the maximum number of downlink (DL) HARQ processes; and $M_{limit}$: a constant equal to 8.

For a frequency division duplex (FDD) LTE system, the maximum number of downlink (DL) HARQ processes $M_{DL\_HARQ}$ is equal to 8. For a time division duplex (TDD) LTE system, $M_{DL\_HARQ}$ varies from 4 to 15 depending on the TDD uplink-downlink configuration. The implication of min ($M_{DL\_HARQ}$, $M_{limit}$) is that a BS would not schedule more than min($M_{DL\_HARQ}$, $M_{limit}$) "active" DL HARQ processes per component carrier for a UE. Therefore, there is no need for the UE to reserve soft buffers for more than $K_C \times K_{MIMO} \times \min(M_{DL\_HARQ}, M_{limit})$ TBs. An active DL HARQ process means one that the TB associated with the DL HARQ process had been already received but not successfully decoded by the UE, and the soft channel bits are stored at the soft buffer.

In a TDD system with the maximum number of DL HARQ processes less than $M_{limit}$ or an FDD system, the equality min ($M_{DL\_HARQ}$, $M_{limit}$)=$M_{DL\_HARQ}$ holds. No issue regarding insufficiency of soft buffer for TBs would occur as long as no more than $M_{DL\_HARQ}$ DL HARQ processes are used. However, for TDD system with the maximum number of DL HARQ processes greater than $M_{limit}$ (i.e., TDD uplink-downlink configurations 2, 3, 4, and 5), the BS would not schedule a user with more than $M_{limit}$ "active" DL HARQ processes concurrently per component carrier to avoid insufficient space of the soft buffer for TBs.

Figure 9:
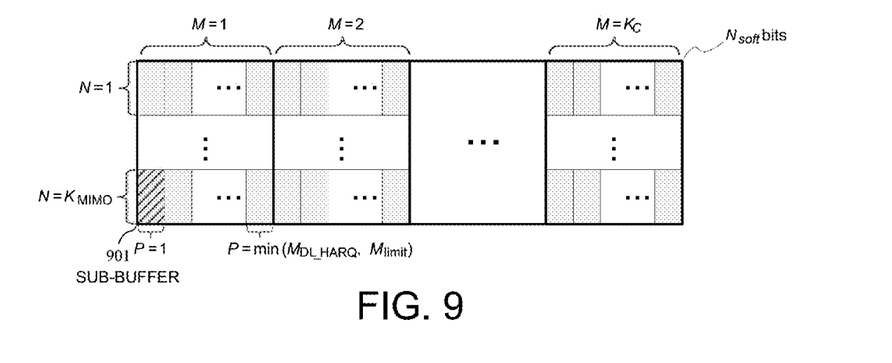
FIG. 9 illustrates the soft buffer partition based on the formula of $N_{IR}$ in 3GPP LTE.

FIG. 9 illustrates the soft buffer partition based on the formula of $N_{IR}$ given in equation (2). The soft buffer can accommodate $N_{soft}$ soft channel bits. The soft buffer is divided into $K_C \times K_{MIMO} \times \min(M_{DL\_HARQ}, M_{limit})$ equal-sized sub-buffers. A shaded sub-buffer 901 is depicted at the left-bottom corner of FIG. 9. The soft channel bits of one TB, with a length of $N_{IR}$, are stored in the shaded sub-buffer 901. In one novel aspect, the idea of restricting the number of active DL HARQ processes to save the soft buffer size for TDD uplink-downlink configurations 2, 3, 4, and 5 can be used for the soft buffer partition in superposition coding.

Figure 10:
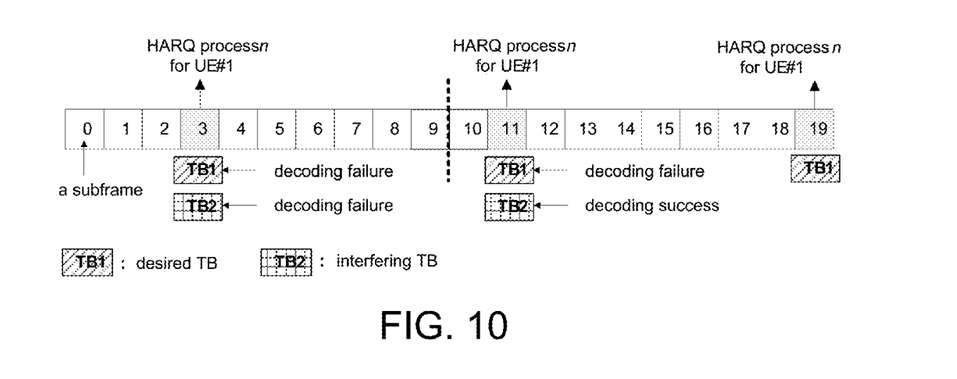
FIG. 10 illustrates downlink HARQ processes associated with desired and interfering signals.

FIG. 10 illustrates downlink HARQ processes associated with desired and interfering signals. FIG. 10 depicts the meaning of "DL HARQ process of an interfering signal". In the example of FIGS. 10, TB1 and TB2 are superposed in the same time-frequency resource, and TB1 and TB2 are desired TBs (intended for a high-geometry UE#1) and interference TBs (intended for other UEs), respectively, from UE#1's perspective. The transmission of TB1 and TB2 both take place at subframe 3. Assume both TBs suffer from decoding failure at subframe 3. As a result, the number of active DL HARQ processes for the desired signal is one from subframes 3 to 10, and the number of active DL HARQ processes for the interfering signal is one during the same interval. Retransmissions of TB1 and TB2 occur at subframe 11. Assume the decoding of TB1 fails, and the decoding for TB2 succeeds. As a result, the soft channel bits for TB2 can be cleared, and the number of active DL HARQ processes for the interfering signal becomes zero. The number of active DL HARQ processes for the desired signal remains to be one.

The proposed method for the soft buffer partition in the superposition coding is described below. The formula of $N_{IR}$ is kept unchanged except that the term $\min(M_{DL\_HARQ}, M_{limit})$ is replaced with a value $P_{MAX}$. That is, $$N_{IR} = \left\lfloor \frac{N_{soft}}{K_C \cdot K_{MIMO} \cdot P_{MAX}} \right\rfloor \quad (3)$$

Where
- $N_{soft}$: total number of soft channel bits;
- $K_{Ce} \in \{1,2,5\}$: a number depending on $N_{soft}$ and UE capability in the number of supportable spatial layers;
- $K_{MIMO}$: equal to 2 if the UE is configured to receive the physical downlink shared channel (PDSCH) transmissions based on transmission modes 3, 4, 8, 9 or 10, and is equal to 1 otherwise;
- $P_{MAX}$: a maximum total number of active DL HARQ processes.

Figure 11:
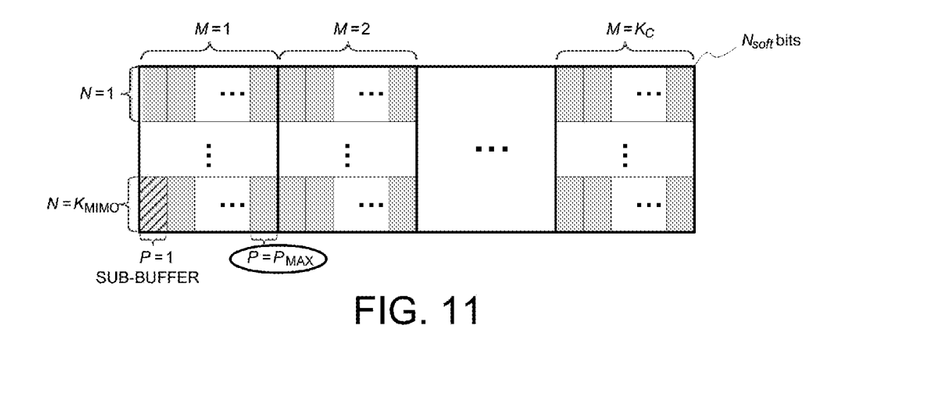
FIG. 11 illustrates soft buffer partition based on a maximum total number of active DL HARQ processes. The maximum total number of active DL HARQ processes includes a first number of active DL HARQ processes for desired signals plus a second number of active DL HARQ processes for interfering signals.

FIG. 11 illustrates the proposed soft buffer partition method based on a maximum total number of active DL HARQ processes $P_{MAX}$. The maximum total number of active DL HARQ processes $P_{MAX}$ includes a first number of active DL HARQ processes for desired signals plus a second number of active DL HARQ processes for interfering signals. Given a UE for which codeword level interference cancellation in the superposition coding is needed, the BS scheduler in general would not schedule more than $P_{MAX}$ active DL HARQ processes per component carrier for the UE, including the HARQ processes associated with desired TBs and the HARQ processes associated with interfering TBs. For example, if a high-geometry UE has T active DL HARQ processes in a component carrier for desired TBs, then the number of active DL HARQ processes in the component carrier for interfering TBs is no more than $(P_{MAX}-T)$.

The value of $P_{MAX}$ can be determined by a predefined function of any of the parameters such as the maximum number of DL HARQ processes, and the UE and network can compute $P_{MAX}$ on its own. The value of $P_{MAX}$ can also be configurable by the BS and sent to the UE. The sizes of the soft buffer for desired and interfering TBs can be dynamically adjusted by the BS scheduler in each component carrier and at any time instant. As long as the total number of active DL HARQ processes does not exceed $P_{MAX}$, the soft buffer size is enough for active TBs. An extreme case is that the soft buffer size for interfering TBs is equal to zero; in this case, no soft packet combining is used for interfering TBs.

Using the proposed method, the soft buffer size is the same for a DL HARQ process corresponding to a desired TB and to an interfering TB. A slight adjustment on the soft buffer sizes can be made for the two types of DL HARQ processes if it is desirable to have different soft buffer sizes for them. In one example, the ratio between the size of a sub-buffer corresponding to a desired signal and the size of a sub-buffer corresponding to an interfering signal is a predefined value. In another example, the ratio between the size of a sub-buffer corresponding to a desired signal and the size of a sub-buffer corresponding to an interfering signal is configurable.

Figure 12:
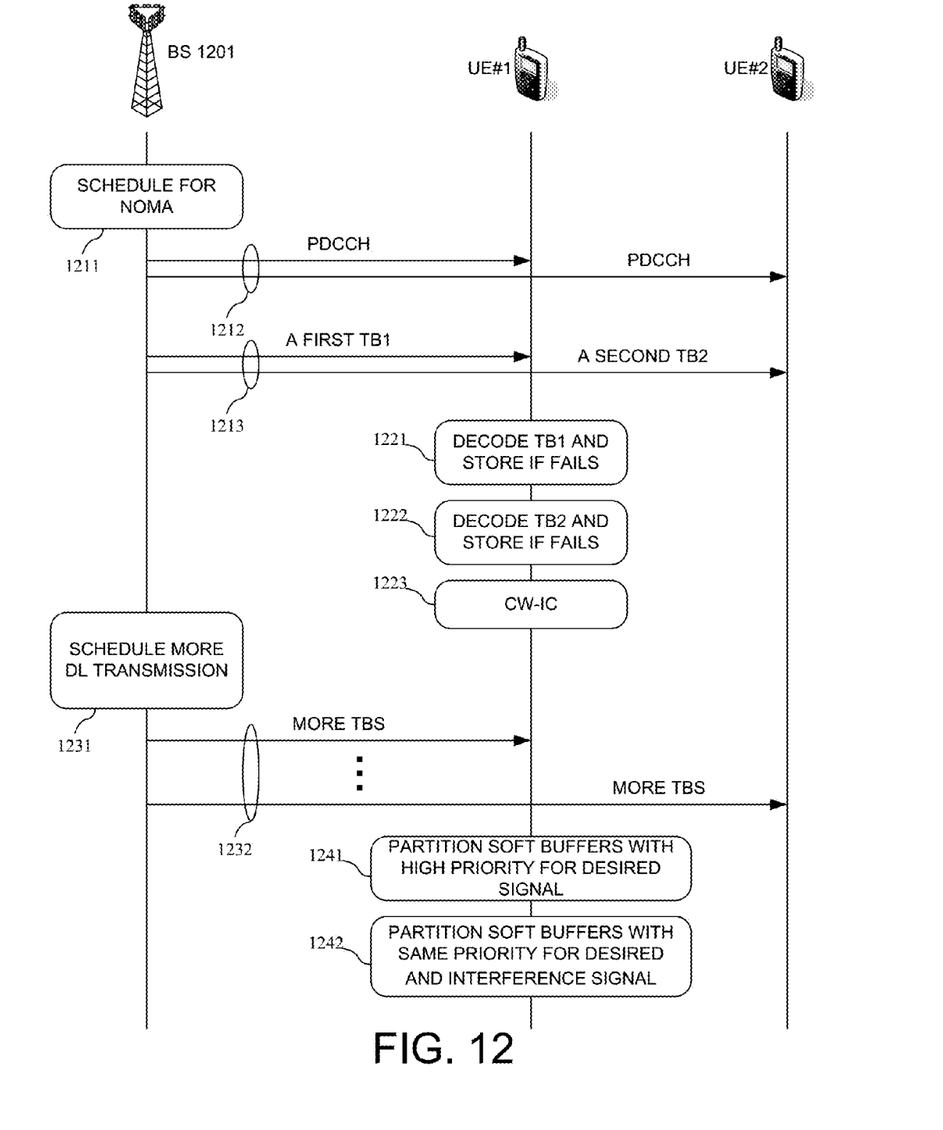
FIG. 12 illustrates a procedure of superposition coding with soft channel bits storage and soft buffer partition for both desired and interfering signals.

FIG. 12 illustrates a procedure of superposition coding with soft channel bits storage and soft buffer partition for both desired and interfering signals. In step 1211, a serving base station BS 1201 schedules a first UE#1 and a second UE#2 for NOMA operation. UE#1 is a high-geometry UE and UE#2 is a low-geometry UE. In step 1212, the BS sends control information to UE#1 and UE#2 via PDCCH. The control information may include information of the code block soft buffer size for UE#2, and may include the maximum number of total active DL HARQ processes for UE#1. In step 1213, the BS transmits superposed transport blocks TB1 and TB2 to UE#1 and UE#2 under NOMA. The encoding and rate matching of TB1 is based on a first soft buffer size for UE#1 and the encoding and rate matching of TB2 is based on a second soft buffer size for UE#2.

In step 1221, UE#1 tries to decode TB1 based on received encoded information bits associated with desired signal. In step 1222, UE#1 tries to decode TB2 based on received encoded information bits associated with interfering signal. Note that UE#1 can try to decode TB2 properly only if UE#1 knows the second code block soft buffer size from the BS. If the decoding of TB1/TB2 is not successful, UE#1 stores the soft channels bits of the encoded information bits in a soft buffer. TB1/TB2 will be retransmitted with another redundancy version and UE#1 will try to perform HARQ soft packet combining and decoding again. In step 1223, UE#1 reconstructs the contribution of the interfering signal TB2 in the received signal and performs CW-IC by subtracting the reconstructed interfering signal TB2 from the received signal. In step 1231, the BS schedules more downlink transmission for UE#1 and UE#2. In step 1232, the BS transmits more TBs to UE#1 and UE#2. Although in general the BS would not schedule more than $P_{MAX}$ DL HARQ processes to a high-geometry UE in the NOMA scheme, exceptions may occur in some occasions. If the number of active DL HARQ processes is larger than $P_{MAX}$, then the UE can rearrange soft buffers allocation based on the priority setting for desired and interfering TBs.

In a first option (step 1241), the TB corresponding to a desired signal has a higher priority than the TB of an interfering signal. Assume all partitioned soft buffers (sub-buffers) have been occupied. In a first scenario, a new DL HARQ process corresponds to a desired signal is activated. If a sub-buffer has been occupied by the DL HARQ process of an interfering signal, then the soft channel bits of the interfering signal stored at the sub-buffer are cleared and the soft channel bits of the new desired TB are stored at the cleared sub-buffer. Otherwise, the soft channel bits of the new DL HARQ process are discarded. In a second scenario, a new DL HARQ process corresponds to an interfering signal is activated. The soft channel bits of the new DL HARQ process are discarded. In a second option (step 1242), TBs corresponding to a desired signal and an interfering signal have the same priority. The soft channel bits of a newly active DL HARQ process are always discarded if all sub-buffers have been occupied.

Figure 13:
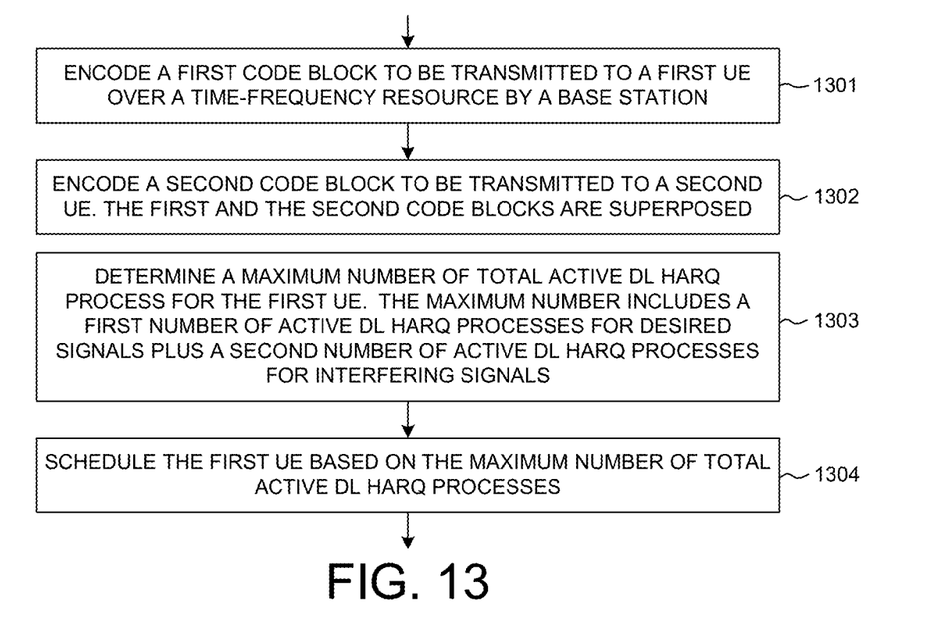
FIG. 13 is a flow chart of a method of soft buffer partitioning from eNB perspective in accordance with one novel aspect.

FIG. 13 is a flow chart of a method of soft buffer partitioning from eNB perspective in accordance with one novel aspect. In step 1301, a base station encodes a first code block to be transmitted to a first UE over a time-frequency resource. In step 1302, the base station encodes a second code block to be transmitted to a second UE. The first and the second code blocks are superposed. In step 1303, the base station determines a maximum number of total active downlink HARQ process for the first UE. The maximum number includes a first number of active DL HARQ processes for desired signals plus a second number of active DL HARQ processes for interfering signals. In step 1304, the base station schedules the first UE for DL transmission based on (e.g., not exceeding) the maximum number of total active DL HARQ processes.

Figure 14:
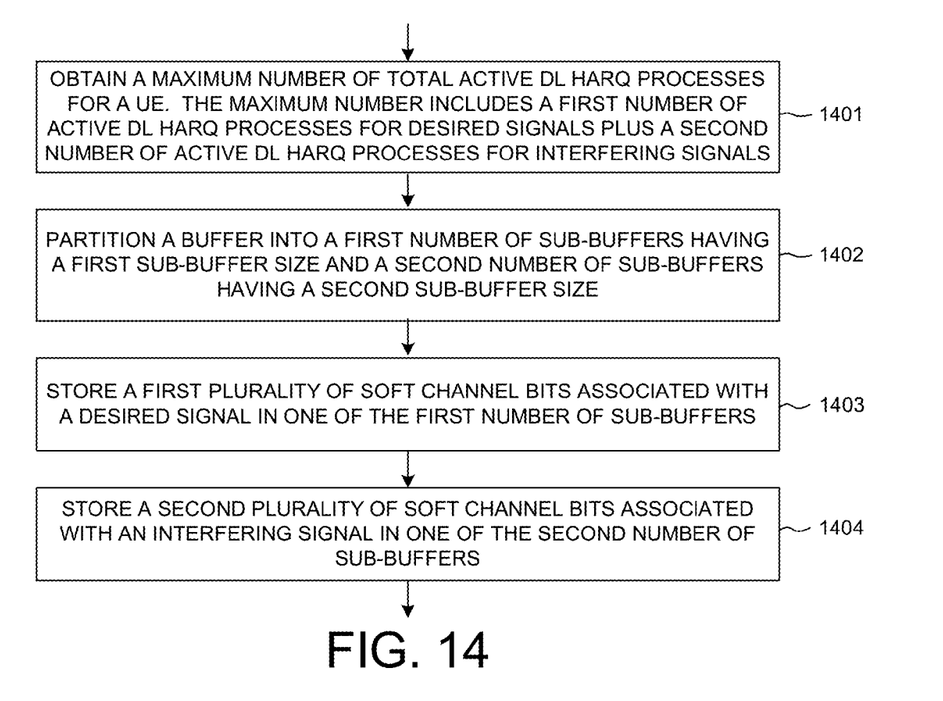
FIG. 14 is a flow chart of a method of soft buffer partitioning from UE perspective in accordance with one novel aspect.

FIG. 14 is a flow chart of a method of soft buffer partitioning from UE perspective in accordance with one novel aspect. In step 1401, a UE obtains a maximum number of total active DL HARQ processes. The maximum number includes a first number of active DL HARQ processes for desired signals plus a second number of active DL HARQ processes for interfering signals. In step 1402, the UE partitions a buffer into a first number of sub-buffers having a first sub-buffer size and a second number of sub-buffers having a second sub-buffer size. In step 1403, the UE stores a first plurality of soft channel bits associated with a desired signal in one of the first number of sub-buffers. In step 1404, the UE stores a second plurality of soft channel bits associated with an interfering signal in one of the second number of sub-buffers.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
    encoding a first code block to be transmitted to a first user equipment (UE) over a time-frequency resource by a base station;
    encoding a second code block to be transmitted to a second UE, wherein the second code block is superposed with the first code block;
    determining a maximum number of total active downlink (DL) hybrid automatic request (HARQ) processes for the first UE, wherein the maximum number includes a first number of active DL HARQ processes for desired signals for the first UE plus a second number of active DL HARQ processes for interfering signals; and
    scheduling the first UE for DL transmission based on the maximum number of total active DL HARQ processes.

2. The method of claim 1, wherein the base station schedules the first UE and the second UE for non-orthogonal multiple access NOMA operation, and wherein the first UE is a high-geometric UE and the second UE is a low-geometric UE respectively.

3. The method of claim 2, wherein the first code block and the second code block are superposed and transmitted over the same time-frequency resource but with different transmission power levels.

4. The method of claim 1, wherein the base station schedules the first UE to decode and cancel the superposed second code block via codeword level interference cancellation (CW-IC).

5. The method of claim 1, wherein a sub-buffer size reserved at the first UE for a transport block is inversely proportional to the maximum number of total active DL HARQ processes.

6. The method of claim 5, wherein the maximum number of total active DL HARQ processes is predefined or signaled to the first UE.

7. A method comprising:
    obtaining a maximum number of total active downlink (DL) HARQ processes for a user equipment (UE), wherein the maximum number includes a first number of active DL HARQ processes for desired signals plus a second number of active DL HARQ processes for interfering signals;
    partitioning a soft buffer into a first number of sub-buffers having a first sub-buffer size and a second number of sub-buffers having a second sub-buffer size;
    storing a first plurality of soft channel bits associated with a desired signal in one of the first number of sub-buffers; and
    storing a second plurality of soft channel bits associated with an interfering signal in one of the second number of sub-buffers.

8. The method of claim 7, wherein the UE is scheduled for non-orthogonal multiple access (NOMA) operation, and wherein the UE is a high-geometric UE.

9. The method of claim 8, wherein the desired signal and the interfering signal are superposed and transmitted over the same time-frequency resource but with different transmission power levels.

10. The method of claim 7, wherein the UE is scheduled by a base station to decode and cancel the interfering signal via codeword level interference cancellation (CW-IC).

11. The method of claim 7, wherein the first and second sub-buffer sizes are inversely proportional to the first and second numbers of active DL HARQ processes respectively.

12. The method of claim 7, wherein a ratio between the first sub-buffer size and the second sub-buffer size is configurable.

13. The method of claim 7, wherein the UE clears one of the second sub-buffers for storing desired signals if all of the first number of sub-buffers are occupied.

14. The method of claim 7, wherein soft channel bits of a newly active DL HARQ process are discarded if all sub-buffers are occupied.

15. A user equipment (UE), comprising:
    a processor that is configured to obtain a maximum number of total active downlink (DL) HARQ processes, wherein the maximum number includes a first number of active DL HARQ processes for desired signals plus a second number of active DL HARQ processes for interfering signals;

a first number of sub-buffers having a first sub-buffer size, wherein the UE stores a first plurality of soft channel bits associated with a desired signal in one of the first number of sub-buffers; and a second number of sub-buffers having a second sub-buffer size, wherein the UE stores a second plurality of soft channel bits associated with an interfering signal in one of the second number of sub-buffers.

16. The UE of claim 15, wherein the UE is scheduled for non-orthogonal multiple access (NOMA) operation, and wherein the UE is a high-geometric UE.

17. The UE of claim 16, wherein the desired signal and the interfering signal are superposed and transmitted over the same time-frequency resource but with different transmission power levels.

18. The UE of claim 15, wherein the UE is scheduled by a base station to decode and cancel the interfering signal via codeword level interference cancellation (CW-IC).

19. The UE of claim 15, wherein the first and second sub-buffer sizes are inversely proportional to the first and second numbers of active DL HARQ processes respectively.

20. The UE of claim 15, wherein a ratio between the first sub-buffer size and the second sub-buffer size is configurable.

21. The UE of claim 15, wherein the UE clears one of the second sub-buffers for storing desired signals if all of the first number of sub-buffers are occupied.

22. The UE of claim 15, wherein soft channel bits of a newly active DL HARQ process are discarded if all sub-buffers are occupied.

* * * * *